May 31, 1949.  M. CULKOSKY  2,471,480
MOTOR BRUSH HOLDER
Filed Oct. 30, 1945
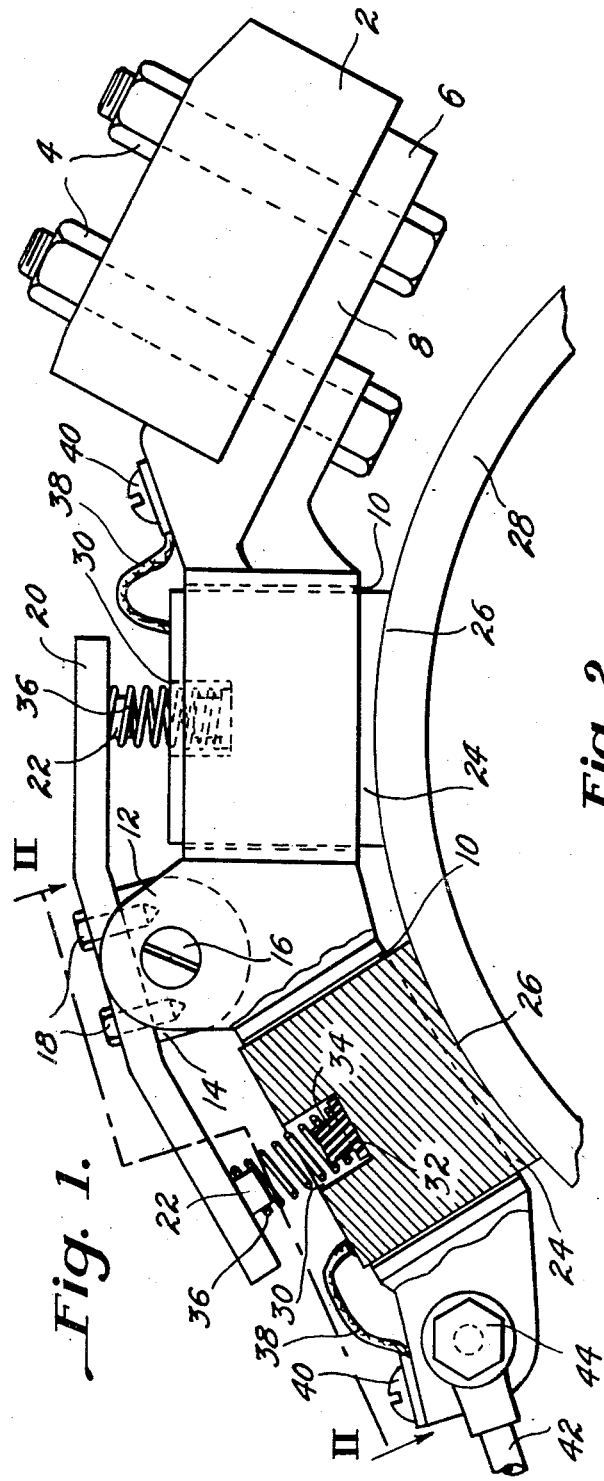
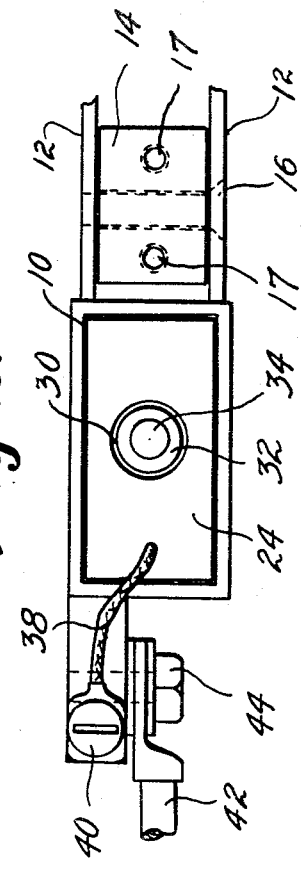
INVENTOR.
Martin Culkosky
BY Donald G. Dalton Patented May 31, 1949

2,471,480

UNITED STATES PATENT OFFICE 2,471,480

MOTOR BRUSH HOLDER

Martin Culkosky, Gary, Ind.

Application October 30, 1945, Serial No. 625,577

3 Claims. (Cl. 171—324)

This invention relates to a motor brush holder and especially to such holders for use on heavy duty A. C. motors having carbon brushes and slip rings. The holder commonly used at present has a leaf-spring mounted on a fulcrum and extending from one side over the brush and bearing against the end of the brush. With this holder it is frequently necessary to change the brushes after a few days of service and the slip rings must be refinished or replaced at frequent intervals. I have found that the short life of the brush and slip rings is primarily due to the manner in which the pressure is applied against the brushes to hold them against the slip rings. The present springs exert a pressure which tends to make the brush tilt slightly on the slip ring so that a reduced contact area is obtained between the brush and slip ring on one end and an air gap is formed on the other end. Since the contact area is reduced, the current going through the brushes to the windings does not have sufficient area to escape to the slip ring. As a result, the brushes become overloaded and sparks jump the air gap leaving burned and pitted slip rings which in turn wear down the brushes. Motor vibrations also cause the brushes to leave the slip rings, thus breaking the contact between the rings and brushes and causing sparks to jump the air gap and burn the rings. With the existing brush holders it is necessary that the entire holder be unscrewed from the arm supporting the holder in order to replace an individual brush. I have also found that with the prior holders the current passing through the spring overheats it, thus lessening the temper of the spring.

It is an object of my invention to provide a brush holder in which the brushes and brush spring may be replaced without disturbing the entire brush assembly.

Another object is to provide a brush holder having the springs insulated from the brushes so that the current will not pass through the spring and cause it to lose its temper.

Still another object is to provide a brush holder having a spring which exerts a constant balanced pressure on the brush of sufficient intensity to keep the brush against the slip ring at all times.

These and other objects will be more apparent after referring to the following specification and attached drawings, in which:

Figure 1 is a side elevation partly in section of the brush holder;

Figure 2 is a view on line II—II of Figure 1 showing a portion of a brush holder with the brush in place and the spring and brush arm removed.

Referring more particularly to the drawings, the reference numeral 2 indicates an insulated brush holder support mounted on the motor frame (not shown). Attached to the support 2 by means of the bolts 4 is a brush holder 6. The number of brush holders is merely illustrative and the number may be varied. In a three-phase motor of the type commonly used on heavy duty service in the mills three holders 6 are mounted on the support 2, one beside the other. The holder 6 has an elongated body member 8 with a pair of spaced apart brush receiving openings 10 therein. Between the openings 10 is a pair of spaced apart lugs 12 for receiving a hub 14 which is held in place by means of screw 16. The hub 14 is provided with tapped holes 17 for receiving screws 18 which hold a brush arm 20 in place over the openings 10. A tap 22 on each end of the arm extends toward the adjacent opening 10. Located in each of the openings 10 is a brush 24 having a circular inner portion 26 for bearing against the slip ring 28. A recess 30 is provided in the center of each brush on the side facing the tap 22. A button-head base 32 having its reduced portion 34 extending toward the tap 22 is located in the opening 30. The base 32 is made of fiber or any other suitable dielectric material. The tap 22 is centrally located over the base 32 and a spring 36 surrounds the tap and reduced portion 34 of the base. The base 32 in addition to insulating the spring from the brush assures a firm even contact between the brush 24 and the spring 36. With this construction the brush 24 contacts the ring 28 throughout the surface 26 and no air gap is formed. Wires 38 are connected to the brush in the usual manner and are fastened to the body member 8 by means of a screw 40. The feed line 42 is connected to the body member 8 by means of a screw 44. When two or more brackets 6 are mounted together, screw 16 is not removable without disturbing adjacent brackets. However, with the arrangement shown, screw 16 need not be removed when it is desired to remove the brush 24 since it is only necessary to remove the screws 18 and 40 and lift the arm 20 and springs 36 out of the way, thus providing a clear space to remove and replace the brush 24.

While one embodiment of my invention has been shown and described, it will be apparent that other adaptations and modifications may be made without departing from the scope of the following claims.

I claim:
1. A motor brush holder for holding the brushes against the slip ring of the motor comprising a body member attached to the motor frame, said member having a pair of spaced apart brush receiving openings therein, a pivot member attached to said body member between said openings, an arm mounted on said pivot member with a part thereof extending over each of said openings, a spring between each end of said arm and the adjacent brush for forcing the brush against the slip ring, and means for centering each of said springs over the center of the respective brushes.

2. A motor brush holder for holding the brushes against the slip ring of the motor comprising a body member attached to the motor frame, said member having a pair of spaced apart brush receiving openings therein, a pivot member attached to said body member between said openings, an arm mounted on said pivot member with a part thereof extending over each of said openings, a spring between each end of said arm and the adjacent brush for forcing the brush against the slip ring, a tap on each end of the arm extending toward each of said openings, a recess in the center of each brush on the side facing said tap, and a spring surrounding each of the taps and extending into the recess of the adjacent brush.

3. A motor brush holder for holding the brushes against the slip ring of the motor comprising a body member attached to the motor frame, said member having a pair of spaced apart brush receiving openings therein, a hub pivotally mounted on said member between said openings, a brush arm attached to said hub and extending over each of said openings, a tap on each end of the arm extending toward each of said openings, a recess in the center of each brush on the side facing said tap, a dielectric base located in each recess, a reduced portion on said base extending toward said tap, and a spring surrounding each of the taps and reduced portions and extending therebetween.

MARTIN CULKOSKY.

REFERENCES CITED

The following references are of record in the file of this patent:

UNITED STATES PATENTS

| Number | Name | Date |
|---|---|---|
| 728,565 | Geisenhoner | May 19, 1903 |
| 776,546 | Priest | Dec. 6, 1904 |
| 1,375,124 | Warder | Apr. 19, 1921 |
| 1,821,405 | Riese | Sept. 1, 1931 |

FOREIGN PATENTS

| Number | Country | Date |
|---|---|---|
| 389,766 | Great Britain | Mar. 23, 1933 |
| 269,203 | Italy | Nov. 13, 1929 |